United States Patent
Coleman et al.

(10) Patent No.: US 12,190,338 B2
(45) Date of Patent: Jan. 7, 2025

(54) MACHINE LEARNING ARCHITECTURES AND PREDICTION MODELS FOR GENERATING DATA ASSET PREDICTIONS

(71) Applicant: ANMUT LTD., Walton-On-Thames (GB)

(72) Inventors: Alexander James Coleman, Cambridge (GB); Herman Rene Heyns, Walton on Thames (GB); Luca Gamberi, London (GB); Ananya Ruth Samuel, London (GB); Stefan Montelongo Davis, London (GB)

(73) Assignee: ANMUT LTD., Walton-On-Thames (GB)

( * ) Notice: Subject to any disclaimer, the term of this patent is extended or adjusted under 35 U.S.C. 154(b) by 0 days.

(21) Appl. No.: 18/389,618

(22) Filed: Dec. 19, 2023

(65) Prior Publication Data

US 2024/0202751 A1    Jun. 20, 2024

Related U.S. Application Data

(60) Provisional application No. 63/476,340, filed on Dec. 20, 2022.

(51) Int. Cl.
*G06Q 30/0202*    (2023.01)
*G06N 20/00*    (2019.01)

(52) U.S. Cl.
CPC ......... *G06Q 30/0202* (2013.01); *G06N 20/00* (2019.01)

(58) Field of Classification Search
None
See application file for complete search history.

(56) References Cited

U.S. PATENT DOCUMENTS

| 8,862,506 B2 | 10/2014 | Smith et al. |
| 2005/0091140 A1 | 4/2005 | Sloan et al. |
| (Continued) | | |

FOREIGN PATENT DOCUMENTS

| WO | WO-2011025987 A1 * | 3/2011 | ............. G06Q 10/08 |
| WO | WO-2014153419 A1 * | 9/2014 | ............. G06F 21/10 |

OTHER PUBLICATIONS

He Wang et al "Research on Intelligent Monitoring and Maintenance Technology of Substation Based on Digital Twin", Dec. 2021, Journal of Physics: Conference Series, pp. 1-5 (Year: 2021).*

(Continued)

*Primary Examiner* — Romain Jeanty
(74) *Attorney, Agent, or Firm* — Bryan Cave Leighton Paisner LLP (57) ABSTRACT

This disclosure relates to improved systems and methods for predicting the correlation between the performance of an entity and one or more data assets related to that entity. The techniques described herein can be utilized to generate various types of data asset predictions that objectively quantify or measure metrics related to the data assets. In some embodiments, one or more machine learning models can be executed to perform relevancy and/or correlation analyses, and the outputs of the machine learning models can be utilized to generate the data asset predictions. Other embodiments are disclosed herein as well.

20 Claims, 4 Drawing Sheets

(56) References Cited

U.S. PATENT DOCUMENTS

| | | | | |
|---|---|---|---|---|
| 2011/0018998 A1* | 1/2011 | Guzik | ................ | H04W 4/80 |
| | | | | 348/143 |
| 2016/0155315 A1* | 6/2016 | McElhinney | ......... | G06F 11/008 |
| | | | | 340/502 |
| 2017/0193417 A1* | 7/2017 | Syed | ................ | G06Q 10/087 |
| 2020/0134083 A1* | 4/2020 | Elliman | ............. | G06F 3/0482 |
| 2020/0302496 A1 | 9/2020 | Todd | | |

OTHER PUBLICATIONS

Shun et al "Constructing personalized situation awareness dataset for hazard perception, comprehension, projection, and action of drivers", Sep. 2021, IEEE Intelligent Transportation Systems Conference (ITSC). pp. 1-8. (Year: 2021).*

Ruoxi Jia, "What is My Data worth?" The Berkeley Artificial Intelligence Research Blog, Dec. 2019, retrieved from https:/bair.berkeley.edu/blog/2019/12/16/data-worth/ p. 1-7.

International Search Report and Written Opinion for PCT/IB2023/063048 dated Mar. 1, 2024.

* cited by examiner

MACHINE LEARNING ARCHITECTURES AND PREDICTION MODELS FOR GENERATING DATA ASSET PREDICTIONS

CROSS-REFERENCE TO RELATED APPLICATIONS

This application claims benefit of, and priority to, U.S. Provisional Patent Application No. 63/476,340 filed on Dec. 20, 2022. The content of the above-identified application is herein incorporated by reference in its entirety.

TECHNICAL FIELD

This disclosure is related to improved systems, methods, and techniques for implementing a predictive model using machine learning architectures. In certain embodiments, the predictive model can be executed to generate predictions pertaining to an entity's data assets.

BACKGROUND

Since the advent of the electronic age, organizations have amassed electronic data for various strategic purposes or goals related to their business. In many scenarios, the data aggregated by an organization can be one of the most strategic and valuable assets of the organization. However, many organizations overlook the importance of their data assets, and tend to view the data assets as burden to maintain.

The types of data assets amassed by an organization can vary greatly. For example, in the transportation industry, certain organizations may aggregate videos and images collected by traffic cameras, vehicle location tracking information, toll information and/or other related information. In the medical industry, an organization may aggregate data pertaining to patient information, patient diagnoses, prescribed medications, and/or similar information. Many other types of data assets can be aggregated across other industries or business sectors.

Currently, there is no framework that enables organizations to quantify and measure the value of their data and/or to quantify and measure the condition or health of the data assets under their control. This is due, at least in part, to variety of technical challenges, such as challenges dealing with understanding the substance of the data which has been aggregated, understanding the activities that drive value for the organization, and/or understanding events that can impact the value of the data assets or the organization controlling the assets. Additionally, in many scenarios, the ability to quantify or measure data assets can be significantly compounded in scenarios where organizations haves compiled data on large scales, and the data is spread across various projects or databases within the organization.

In view of the foregoing, there is a need for a technical framework that can objectively quantify and measure data assets of organizations, and generate various insights and metrics relating to the data assets of the organizations.

BRIEF DESCRIPTION OF DRAWINGS

To facilitate further description of the embodiments, the following drawings are provided, in which like references are intended to refer to like or corresponding parts, and in which.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION OF EXEMPLARY EMBODIMENTS

The present disclosure relates to systems, methods, apparatuses, computer program products, and techniques for generating data asset predictions corresponding to data assets of enterprises, organizations, and/or other entities. Various types of data asset predictions can be generated using the techniques described herein. Amongst other things, the data asset predictions can indicate or predict the importance of each data asset associated with an entity, and/or can predict values associated with the data assets. The prediction model can also evaluate the health or condition of the data assets. The health of data assets may be represented as a value, which falls within some predefined range, or as a comparative value with respect to another set of similar data. As described in further detail below, the prediction model can include various machine learning architectures that enable the prediction model to rapidly generate the data asset predictions with high precision and accuracy.

In certain embodiments, the prediction model can receive and analyze historical data associated with an entity to identify shock events that impacted the entity. In turn, these shock events can be used to identify contemporaneous reporting data that became available in event windows spanning time periods that precede and/or follow the occurrences of the shock events. For each detected shock event, a relevance model included in the machine learning architecture can analyze the contemporaneous reporting data included in an event window to identify the contemporaneous reports (or information included therein) that are relevant to the entity and/or the shock event. The contemporaneous reporting data determined to be relevant can be tagged with value driver annotations, each of which can include a label that contributed to the occurrence of the shock event. The prediction model also can estimate the dependency of each value driver annotation on each data asset to determine the data criticality for that data asset. Along with these dependencies, the prediction model can utilize correlations between the value driver annotations and the shock events to generate the data asset predictions.

The data asset predictions can include, inter alia, determinations or predictions associated with valuations of the data assets of the entity. The valuations of the data assets of the entity may be calculated as one data asset prediction comprising the value of all data assets to the entity. Alternatively, or in addition, a data asset prediction can be calculated for each identified data asset, or a subset thereof, utilizing the data asset prediction for the entirety of the entity's data and data criticality for each identified data asset of interest. These data asset predictions can estimate how dependent an entity's value is with respect to its data assets, or a subset thereof, or single data asset. In certain embodiments, these data asset predictions can be sent to the one or more computing devices where they can be stored and/or presented to users of the prediction model. Various types of graphs, charts, and/or metrics may be generated to visualize the data assets predictions to the users. Additionally, or alternatively, the data asset predictions may be used as inputs to other processing systems for further data analysis.

The data asset predictions also can include information that identifies the health or condition of an entity's data assets. The health or condition of a given data set may be calculated based on one or more of the following factors: the age of the data set or average age of the data in the data set, the data set's refresh rate, the breadth or scope of the data set, the depth of the data set, its granularity, the longitudinality (that is, the timeframe covered by the data set), and the data set's fitness for purpose or utility within a certain field or for a certain activity. Some of these factors are objective measures that can be calculated or ascertained from the data set itself. Other factors, such as the data set's fitness for purpose, may be derived by consulting certain external sources. In certain embodiments, a data set's fitness for purpose may be determined, at least in part, by its (or similar data's) use by official bodies or as part of government policy. Additionally, or alternatively, a data set's fitness for purpose may be determined, at least in part by, its (or similar data's) use by participants within a certain field or sector. A data set's health score may be used by the prediction model to calculate, at least in part, other types of data asset predictions and/or to determine confidence intervals for the data asset predictions or for any other value generated by the prediction model.

The technologies described herein provide a variety of benefits and advantages. Amongst other things, the data asset predictions generated by the prediction model enable data assets of an entity to be objectively analyzed, assessed, and quantified. These predictions facilitate the discovery and understanding of how specific data assets can improve or hinder an entity's performance. They further facilitate informed decision-making with respect to managing, developing, and leveraging the data assets available to the entity. These technologies provide quantifiable results with a level of granularity that is unmatched by traditional assessment systems.

The technologies discussed herein can be used in a variety of different contexts and environments. One useful application of these technologies is in the context of assessing the importance and/or value of an entity's data assets, both individually and cumulatively. Another useful application is in the context of evaluating an entity's data assets for stakeholders (e.g., company investors) of an entity. In these and other scenarios, understanding the sensitivity of a given entity or system to specific data assets and value drivers can be objectively determined based on the historical performance data associated with the entity or system.

Additionally, the technologies described herein can be applied to assess data assets and generate predictions for entities or systems in any industry, including but not limited to, science, engineering, social media, finance, logistics, advertising, information technology, transportation, retail, manufacturing, healthcare, and many other industries. Regardless of the industry, the technologies disclosed herein may be used to evaluate an entity's data resources based on that entity's historical data and performance.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1A:
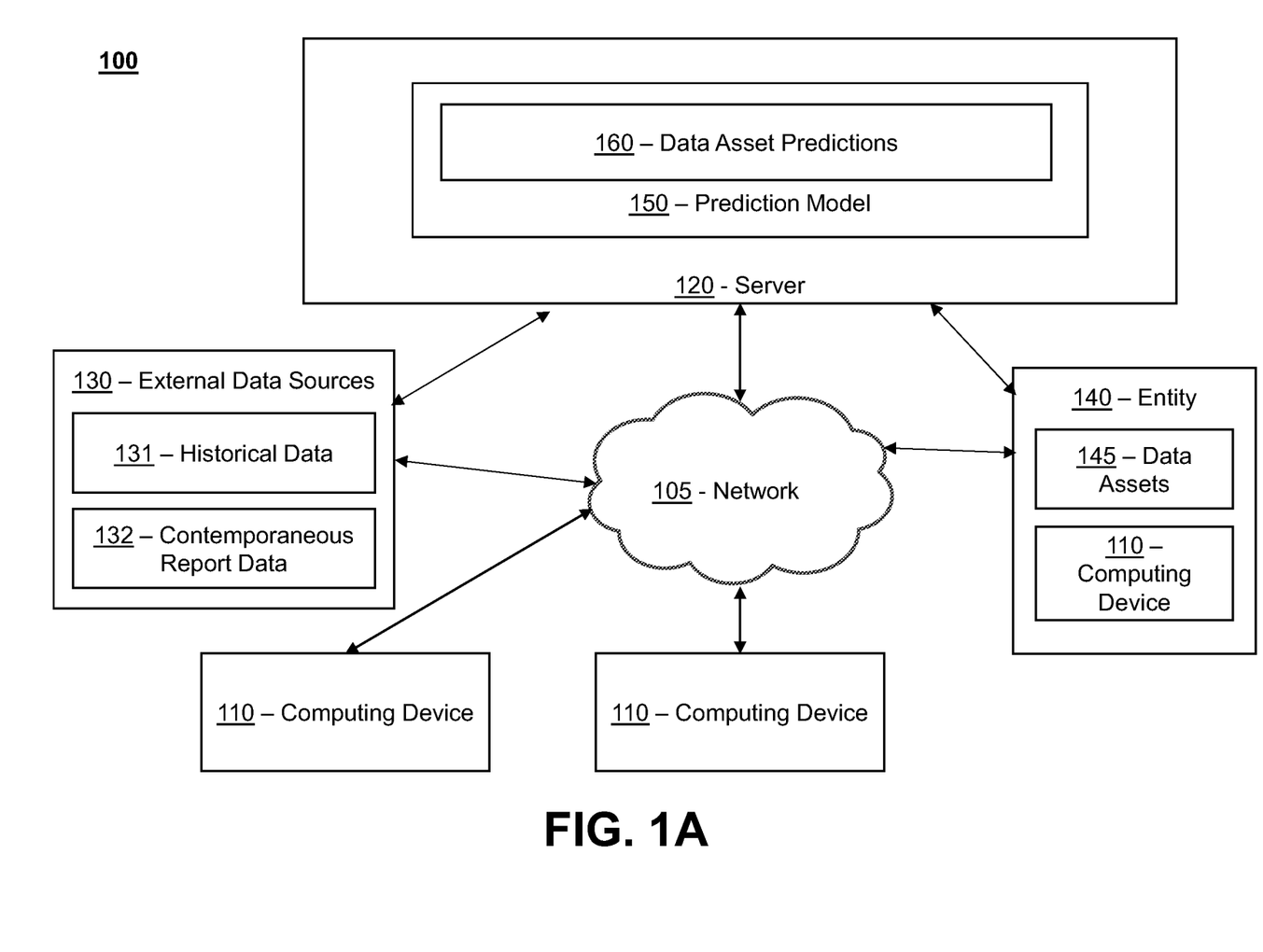
FIG. 1A is a diagram of an exemplary system of the correlation prediction modeling system in accordance with certain embodiments.
Figure 1B:
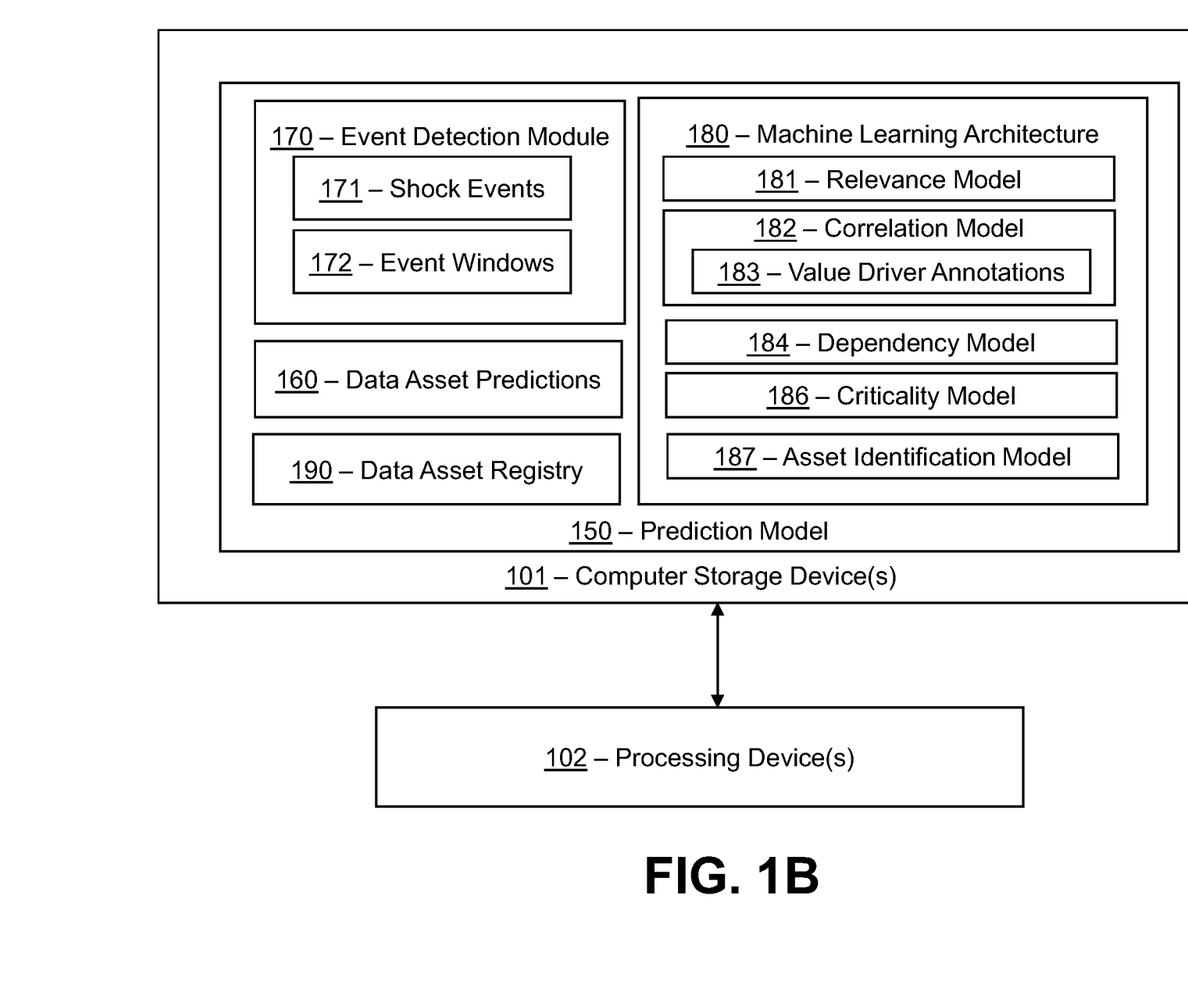
FIG. 1B is a block diagram demonstrating exemplary features of an prediction model in accordance with certain embodiments.

FIG. 1A is a diagram of an exemplary system 100 in accordance with certain embodiments. FIG. 1B is a diagram illustrating exemplary features, components and/or functions associated with a prediction model 150.

The system 100 comprises one or more computing devices 110, one or more servers 120, one or more external data sources 130, and one or more entities 140 that are in communication over a network 105. A prediction model 150 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks. In certain embodiments, the one or more external data sources 130 and one or more entities 140 can communicate directly with the one or more servers 120 and/or the prediction model 150.

All the components illustrated in FIG. 1A, including the computing devices 110, servers 120, external data sources 130, entities 140, and prediction model 150 can be configured to communicate directly with each other and/or over the network 105 via wired or wireless communication links, or a combination of the two. Each of the computing devices 110, servers 120, external data sources 130, entities 140, and prediction model 150 can include one or more communication devices, one or more computer storage devices 101, and one or more processing devices 102 that are capable of executing computer program instructions. The computer storage devices 101 can be physical, non-transitory mediums.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices 101 including, but not limited to, instructions associated the executing prediction model 150 or its various subcomponents (discussed in more detail below).

The one or more computer storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices 101 may be physical, non-transitory mediums. The one or more computer storage devices 101 can store instructions associated with executing prediction model 150 and/or its subcomponents (discussed in more detail below).

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable the computing devices 110, server(s) 120, external data source(s) 130, entity(ies) 140, and/or prediction model 150 to be connected to the Internet and/or other network. The modem devices can permit bi-directional communication between the Internet (and/or other network) and the computing devices 110, server(s) 120, external data source(s) 130, entity(ies) 140, and/or prediction model 150. In certain embodiments, one or more router devices and/or access points may enable the computing devices 110, server(s) 120, external data source(s) 130, entity(ies) 140 and/or prediction model 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, server(s) 120, external data source(s) 130, entity(ies) 140, and/or prediction model 150 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that that can execute web servers and can communicate with the computing devices 110 and/or other devices over the network 105 (e.g., over the Internet).

In certain embodiments, the prediction model 150 can be stored on, and executed by, the one or more servers 120. Additionally, or alternatively, the prediction model 150 can be stored on, and executed by, the one or more computing devices 110.

In some embodiments, the prediction model 150 also can be stored as a local application on a computing device 110, or integrated with a local application stored on a computing device 110, to implement the techniques and functions described herein. In certain embodiments, the prediction model 150 can be integrated with (or can communicate with) various applications including, but not limited to, applications that are stored on a computing device 110 and/or server 120.

In certain embodiments, the one or more computing devices 110 can enable individuals to access the prediction model 150 over the network 105 (e.g., over the Internet via a web browser application). For example, an individual can utilize a computing device 110 to send commands and/or requests over the network 105 to the prediction model 150. The prediction model 150 can perform analyses and/or generate data asset predictions 160 using the techniques described in this disclosure. The analyses and/or data asset predictions 160 generated by the prediction model 150 can be transmitted over the network 105 to the computing device 110 and/or to other computing devices 110.

Each entity 140 may represent a company, business, organization, individual, or the like that manages, owns, maintains, and/or provides a collection of data comprising one or more data assets 145. In some scenarios, an entity 140 may provide a technology-based infrastructure (e.g., which may include an enterprise system, websites, mobile apps, network resources, etc.) that facilitates operations of the entity 140, and that entity 140 can accumulate or amass various data assets 145 over the course of time, which often can be related to the business or industry associated with the entity 140.

The types of data assets 145 associated with each entity 140 can vary greatly. For example, an entity 140 associated with transportation services or monitoring can comprise data assets 145 pertaining to videos and images collected by traffic cameras, vehicle location tracking information, toll payment information and/or other related information. In another example, an entity 140 associated with social media services can include data assets 145 pertaining to user profile information, user posts, user communications, videos, graphics, photographs, and/or similar information or data. In a further example, an entity 140 associated with healthcare services can include data assets 145 pertaining to patient biographical information, patient demographic information, patient symptoms, patient treatments, patient diagnoses, prescribed medications, staffing information (including staff biographical information, experience, educational background, specialties, etc.), equipment resources, and/or similar information.

The prediction model 150 can perform functions associated with generating data asset predictions 160 relating to those data assets 145. The data asset predictions 160 can aid entities 140 with managing and developing their data assets 145, and can indicate values associated with the each of the data assets 145 (as well as other related information described herein). In some embodiments, an entity 140 interested in obtaining a better understanding of its data assets 145 can enter into an agreement with a provider of the prediction model 150 and/or establish an electronic user account with the provider of the prediction model 150. In some scenarios, the prediction model 150 can be included as part of data analysis platform that provides various products or services related to analyzing, assessing, and/or understanding data assets 145.

The prediction model 150 may communicate with, or receive data from, one or more external data sources 130, which can be utilized by the prediction model 150 to generate the data asset predictions 160. The external data sources 130 can correspond to websites, third-party servers, third-party computing devices, databases, or the like, which provide access to the data.

The data or information received from the one or more external sources 130 can include historical data 131 associated with one or more entities 140 (e.g., including, but not limited to, historical stock price data associated with the entities 140). As explained in further detail below, this historical data 131 can be utilized, inter alia, to detect shock events that impacted a value of the entity 140 or its data assets 145. In some scenarios, the historical data 131 may be obtained from a third-party financial entity and/or from a website or database associated with a financial entity.

The data or information received from the one or more external sources 130 also can include contemporaneous report data 132, which may include articles, publications, reports, and/or other public information that was available during a specified time period immediately preceding or surrounding a detected shock event. The contemporaneous report data 132 can be analyzed and correlated with value drivers attributed to the shock event and, in turn, these correlations can be used to generate the data asset predictions 160. In some scenarios, the contemporaneous report data 132 may be obtained from a publisher, news organization, and/or other data aggregator (e.g., such as Dow Jones® or Reuters®).

The types of data asset predictions 160 generated for an entity 140 by the prediction model 150 can vary. In some cases, the data asset predictions 160 may indicate or predict a separate value of each data asset 145 associated with the entity 140. This may include predicting a score that indicates the importance of each data asset 145 and/or predicting a monetary value (or range) associated each data asset 145. Additionally, or alternatively, the data asset predictions 160 can indicate or predict a cumulative importance score and/or a cumulative monetary value across all data assets 145 associated with an entity 140 or for a subset of data assets 145 associated with the entity 140. In certain embodiments, the prediction of the cumulative importance score and/or the cumulative monetary value across all data assets 145 for an entity 140, or a subset thereof, may be calculated without calculating an importance score or monetary value for each (or any) data asset 145 of the entity 140. Additionally, or alternatively, the data asset predictions 160 also can indicate value drivers relevant to an entity (e.g., factors that negatively or positively influence the value of an entity 140 and/or the entity's data assets 145). Additionally, or alternatively, the data asset predictions 160 can include information that correlates the data assets 145 of an entity with detected value drivers that are ascertained by the prediction model 150. Additionally, or alternatively, the data asset predictions 160 can include information that indicates the health or condition of the data assets 145. The prediction model 150 can generate other types of data asset predictions 160 as well.

FIG. 1B is a block diagram of an exemplary prediction model 150 in accordance with certain embodiments. In this example, the prediction model 150 includes an event detection module 170 and a machine learning architecture 180 that includes a relevance model 181, a correlation model 182, a dependency model 184, a criticality model 186, and an asset identification model 187. The prediction model 150 (and its subcomponents) can be implemented as computer program instructions that are stored on one or more computer storage devices 101 and executed by one or more processing devices 102.

The event detection module 170 can receive the historical data 131 from one or more external data sources 130 (shown in FIG. 1A). In some scenarios, historical data 131 can include historical stock price information for an entity 140 (e.g., indicating the changes in publicly traded stock values for the entity 140 over a period of time).

The event detection module 170 can be configured to analyze the historical data 131 to detect one or more shock events 171. Each shock event 171 can generally correspond to an event or occurrence that has negatively or positively impacted the value of the entity 140. In some scenarios, each shock event 171 can represent a point in time when an actual value of the entity 140 was lesser or greater than an expected value of the entity 140 at that time.

The manner in which the shock events 171 are detected can vary. In certain embodiments, the shock events 171 are identified by comparing the actual values of the entity 140 as recorded in the historical data 131 over a period of time to the expected values of the entity 140 over that period of time, and detecting when the expected values differ from the actual values (which can be referred to as calculating abnormal return). Shock events 171 can correspond to time periods when the expected values vary from actual values beyond a predetermined threshold (e.g., by a variance of 10%, 20%, 50%, or other threshold).

In some scenarios, different valuation models may be used. For example, other methods for detecting shock events 171 and delineating event windows 172 in the historical data 131 may also be used in addition, or alternatively, to the approaches outlined above. These valuation models may be industry or sector specific or they may be specific to the entity 140. The valuation models may be sourced from a third party or the entity 140 in some scenarios. Further, in various scenarios, different types of historical data 131 may be used along with the different valuation models in calculating the event windows 172 and the shock events 171.

The expected value of historical data 131 can be determined using a variety of techniques. In certain embodiments, a markup model is used which predicts stock price of the entity 140 for a given point in time based on its historical performance compared to a relevant market index. Other exemplary techniques can involve comparing the actual values in the historical data 131 to its historical performance. In certain embodiments, the actual value of entity 140 for a given point in time can be determined or ascertained directly from the historical data 131.

In addition to detecting shock events 171, the event detection module 170 can further detect event windows 172 that define the beginning and the end of the shock event (e.g., such as regions of abnormality when the actual stock price diverges from the expected stock price). Each event window 172 can define a period of time where the expected value of the entity 140 varies from the actual value. The times that mark the bounds of these event windows 172 can be stored and used for further processing by other components of the prediction model 150.

The relevance model 181 of the machine learning architecture 180 can receive the information related to the identified event windows 172 and corresponding shock events 171. For each event window 172, contemporaneous report data 132 that was generated or published during the event window 172 can be retrieved. The relevance model 181 can analyze the content (e.g., text) of the contemporaneous report data 132 to identify specific reports, documents or the like that pertain to an entity 140 and/or the entity's data assets 145. In certain embodiments, for each piece of content included in the contemporaneous report data 132, the relevance model 181 can analyze each sentence (or section of text) and apply a tag or annotation that indicates whether it is relevant or irrelevant to the entity 140. In this manner, the relevance model 181 can identify content (or portions thereof) from the contemporaneous report data 132 that is applicable to the entity 140. Prior to generating these relevance determinations, the relevance model 181 (or other component) can preprocess the contemporaneous report data 132 to remove unwanted data or content (e.g., images, videos, animations, etc.) from the contemporaneous report data 132 received from the external data source(s) 130.

Various models can be utilized to implement the functionality of the relevance model 181, and the configuration of the relevance model 181 can vary. In certain embodiments, the relevance analyses performed by the relevance model 181 can be performed using a pre-trained machine learning model. For example, in some cases, a gradient boosting model, such as XGBoost (or other similar model), can be trained to execute the relevance analyses on the content included in the contemporaneous report data 132.

Such learning models can be trained in a fully-supervised fashion using a training set of data that is tagged with annotations indicating whether particular sentences or content are relevant and/or irrelevant. In certain embodiments, the training set that is utilized can be agnostic to the type of system or entity 140 being analyzed. Other learning models and training techniques also may be utilized.

Each piece of content from the contemporaneous report data 132 that is determined to be relevant can be tagged with one or more value driver annotations 183. Each value driver annotation 183 can represent a label that identifies a potential control factor or potential causation that affected (or has the ability to affect) the value of the entity 140 and/or contributed to a detected shock event 171. Examples of value driver annotations can include labels pertaining to government regulations, initiatives or programs launched by the entity, mergers or acquisitions involving the entity or industry competitors, insider trading issues relevant to the entity, competitive market factors, organizational governance or changes (e.g., staff changes, new board members), product releases, movement into new markets, corporate or operational strategy changes, etc.

The manner in which value driver annotations 183 are determined and applied to the relevant contemporaneous report data 132 can vary. One technique for performing these functions includes manually annotating the relevant portions of the contemporaneous report data 132 based on human review. Another technique can involve application of a machine learning algorithm to automatically apply the value driver annotations 183. Thus, in some scenarios, the machine learning architecture 180 may further include a correlation model 182 that is trained to annotate the contemporaneous report data 132 with value driver annotations 183. For example, gradient boosting models, such as XGBoost or similar learning models, can be trained to apply the value driver annotations 183 to the contemporaneous report data 132. These and other models are trained using a semi-supervised or fully supervised approach with a pre-annotated training set comprising report data or text that is labeled with value driver annotations 183. Additionally, in certain embodiments, the training of the correlation model 182 may utilize user validation to validate the value driver annotations 183 added by the machine learning architecture.

In one example, the correlation model 182 may be trained using a training set that includes, in certain embodiments, data from preexisting valuation models which reflect either subjective or objective valuation estimates (either internally developed or acquired from an external source), reports, documents, articles or other data annotated with ground-truth value driver annotations 183. Because value driver annotations can vary across different industries or sections, the correlation model 182 may be separately trained using training data and annotations that are specific to each sector or industry. In some cases, a tree-based or tier-based approach may be applied in which the value driver annotations 183 are arranged in hierarchical topic classification and/or multi-class/multi-label classification. The multi-class/multi-label classifications are capable assigning multiple value driver annotations to each portion of the contemporaneous report data 132 (such as portions of text or an article).

Regardless of its implementation, the correlation model 182 can be configured to receive the shock events 171 and event windows 172 from the event detection module 170, and determine correlations between the shock events 171 and the value driver annotations 183. These correlations can be utilized to quantify the sensitivity of the entity's value to each of the identified value driver annotations 183. In certain embodiments, a visualization of this output, such as a chart, can be created for display to a user on any of the computing devices 110. This output may be normalized as part of the processing. In certain embodiments, the values of the correlations within this output may be normalized so that they sum to a total value associated with the entity 140. In certain embodiments, where the entity 140 being analyzed is a publicly traded company, the values of these correlations in the output of the correlation model 182 can be scaled to equal the total valuation of the publicly traded company. In certain embodiments, where the system being studied is a non-public company or other such entity, the total output of the correlation model 182 can be scaled to another value representing the whole of the entity 140, such as the total value of the money invested in the entity 140.

In certain embodiments, the prediction model 150 includes an asset identification model 187 that performs functions related to generating a listing or inventory of data assets 145 for entities 140. The data assets 145 associated with the entity 140 can vary based on the industry or sector associated with the entity 140. The manner in which the data assets 145 are identified by the asset identification model 187 also can vary.

In some embodiments, the listing of data assets 145 can be prepared manually (e.g., based on a human review of data assets 145 relevant to particular industry, sector, and/or business). For example, the asset identification model 187 can provide one or more graphical user interfaces (GUIs) that enable the data assets 145 for an entity to be selected or identified. In some embodiments, the asset identification model 187 may store a library or catalog of data assets that are specific to each industry or sector, and this library or catalog can be leveraged to generate the listing of data assets 145 for the entity.

Additionally, or alternatively, the asset identification model 187 can include a learning model that is trained to assist with generating listings of data assets 145 for entities 140. In some examples, the learning model can ingest a corpus of text related to an entity 140 (e.g., and/or the industry, sector, or business associated with the entity 140) and can output a listing of candidate data assets (e.g., which can then be reviewed, filtered, and/or supplemented by a human reviewer familiar with the entity 140). In certain embodiments, the learning model can include one or more language models, such as one or more generative pre-trained transformer (GPT) models and/or other suitable large language models (LLMs), that are trained to execute natural language processing (NLP) tasks, such as topic modeling tasks, text classification tasks, text generation tasks, text clustering tasks, named entity recognition (NER) tasks, and/or other types of NLP tasks. The language model may receive and ingest text related to the entity 140 (e.g., text from textbooks, articles, the Internet, etc.), and may execute one or more NLP tasks (e.g., topic modeling tasks) to output a ranked listing of terms, phrases, and/or topics that correspond to candidate data assets that may be relevant to the entity 140. This listing can then be reviewed, edited, and/or supplemented by the human reviewer.

Additionally, while certain language models trained on topic modeling tasks return words that frequently appear together (forming a "topic"), the language model utilized to identify the data assets 145 can be specially configured using a seed guidance technique. With this technique, the language model is guided by a "seed" word or phrase that directs it to extract topics related to a specific theme. For example, given a seed term such as "data," the language model can be prompted to recall topics or clusters of words related to potential data assets and a listing can be generated for human review. Various other techniques also can be utilized to generate the listing of data assets 145.

The dependency model 184 of the machine learning architecture 180 can be configured to determine correlations between the data assets 145 of the entity 140 and the value driver annotations 183. In some embodiments, these correlations can be used measure how reliant an entity 140 is on a data asset 145 (or collection of data assets 145) to achieve a particular outcome or to perform a particular activity (e.g., in comparison to other assets, such as technologies, people, buildings, etc., associated with the entity 140).

In some cases, the dependency model 184 can generate or output dependency scores indicating the dependency of a value driver annotation 183 on each data asset 145 and/or the dependency of value driver annotation 183 on the entirety of the data of the entity 140. In some embodiments, these dependency scores can indicate a percentage measure reflecting the extent to which the data assets 160 (or data in general) contribute to the delivery of each value driver (or corresponding value driver annotation 183). In some embodiments, the dependency scores can be calculated based on a consideration of a multiple variables, such as variables indicating how data is used in the planning and delivery of an outcome or activity, how regularly the data is used, how detrimental poor data would be to the delivery or outcome, how much data is required to make decisions, etc.

This calculation of the dependency scores can be performed in a number of ways. In certain embodiments, the machine learning architecture 180, or dependency model 184 included therein, determines these dependencies by processing survey data (e.g., responses to surveys) collected from individuals within an entity 140 which relate to the functioning of the entity 140. In certain embodiments, the machine learning architecture uses a gradient boosting technique, implemented using tools such as XGBoost, that ingests a questionnaire comprising questions related to the relationship between the value driver annotations 183 and each of the data assets 145 of the entity 140. The output, which may be represented as a percentage score, is an estimate of the dependency between each data asset 145 and each value driver annotation 183 tagged in the contemporaneous report data 132. In certain embodiments, the dependency model 184 undergoes fully supervised training using a custom training set tailored to the data assets 145 and other attributes of the entity 140. The training set may be created manually, or it may be created automatically using objective metrics relating to the dependencies between the data assets 145 and the value driver annotations 183.

In certain embodiments, survey data may be used to identify the data assets 145 which are ultimately correlated to the historical data 131. In the context of publicly traded companies and other public or private entities, these data assets 145 may be any data resource that is controlled or used by the entity 140 from which the entity 140 expects to reap future economic value. The dependency model 184 (or component of the prediction model 150) outputs the data asset predictions 160, which can include predictions of the correlation between the historical data 131 and each data asset 145 identified as being related to the entity 140. In certain embodiments, the data asset prediction 160 for a given data asset 145 may be an estimate of the data asset's value, and, in certain embodiments it may be denominated using a unit of currency (e.g., such as the US dollar or British pound). In certain embodiments, alternative valuation models supplied by a third party or the entity 140 may be used to confirm, or to compare to, the data asset predictions 160.

The dependency model 184 can utilize other techniques to determine correlations between the data assets 145 of the entity 140 and the value driver annotations 183. For example, rangefinding and assumptive models also may be used to identify the data assets 145 and correlate them to the value driver annotations 183. In certain embodiments, source-agnostic inputs and data models which rely on reference datasets and/or existing libraries of data may be used, which can be refined and/or developed over time, or from entity to entity. The techniques and methods for identifying the data assets 145 and/or performing the correlations to value driver annotations 183 may be implemented using the machine learning techniques. For example, in some instances, the dependency model 184 can include a learning model that is trained (e.g., using historical data) to determine correlations between the data assets 145 of the entity 140 and the value driver annotations 183.

In some examples, the data dependency model 184 utilizes one or more NLP models to generate the data dependency scores. This can involve creating two distinct libraries of seed phrases: 1) one library identifying the data assets 145; and 2) the other library identifying all other types of assets, including physical and various intangibles. These libraries can be generated using a combination of a proprietary knowledge base, such as a maturity framework and intangible asset tree, as well as external sources like balance sheets and accounting frameworks. The process can involves counting the number of news articles that include one or more of these seed phrases. The data dependency scores can then calculated as the proportion of article counts associated with data compared to the total count.

Additionally, or alternatively, the data dependency model 184 can utilize a perturbative modeling approach to assist with generating the dependency scores. In this approach, a perturbative learning model can be utilized to model certain macro-processes of an entity, and to estimate the role of a data asset 145 (or collection of data assets 145) in achieving the associated outcomes. Separate models can be utilized to model each macro-process. For example, one model can analyze the impact that poor data would have on the ability to target particular customers for particular services or products (e.g., customer profiling/segmentation), while other models can be configured for other types of processes.

Regardless of how they are computed, the dependency scores output by the dependency model 184 can be a percentage score in some cases. This percentage score can then be applied to an entity's value to estimate how much credit a given data asset 145 (or collection of data assets 145) is afforded with respect to achieving a given outcome and the percentage score can be converted to monetary terms in some instances.

The criticality model 186 of the machine learning architecture 180 can be configured to determine the criticality of data assets 145 of the entity 140 to the value driver annotations 183. In some embodiments, the criticality model 186 can be configured to output criticality scores for the data assets 160, each of which indicates the importance of a given data asset 160 to a value driver (or corresponding value driver annotation 183). In some embodiments, each criticality score may represent a percentage measure indicating the importance of a data asset 160 to a given value driver. For each data asset 160, separate criticality scores may be generated for each value driver.

The criticality of the data assets 145 to each value driver annotation 183 can be calculated in a number of ways. In certain embodiments, these criticalities are determined by processing survey data collected regarding the importance of each data asset 145 to each data driver annotation 183. In certain embodiments, a questionnaire distributed to individuals in the entity 140 prompts the survey takers to score the criticality of each data asset 145 of the entity 140 on a scale from 0 (meaning completely irrelevant) to 5 (meaning extremely critical) with respect to each of the value driver annotations 183. These survey results may be normalized for each of these data assets 145 for each of the value driver annotations 183. The survey results may then be further converted into percentage scores. These percentage scores representing the data criticality from the criticality model 186 may further be used to calculate the data asset predictions 160.

Confidence intervals may also be calculated for data asset predictions 160 and for other values generated by the prediction model 150. Confidence intervals may be represented in a number of different ways. In certain embodiments, the confidence intervals may be given as a measure of confidence, as a percentage, and/or as a range, measured in the same units as or as a percentage of the value to which the confidence interval pertains. Confidence intervals may be calculated for the data asset predictions 160, the values of the shock events 171 and event windows 172, for the values of the output of the correlation model 182, the output of the criticality model 186, and/or other values generated by the prediction model 150. In certain embodiments, a confidence interval of may be calculated and displayed with a margin of error, indicating a range or amount of possible miscalculation.

The confidence intervals may be calculated using a variety of different methods. In certain embodiments, valuations of comparable assets, such as the sales prices of similar data assets, may be used to calculate the confidence intervals. Financial data from other entities similar to or in the same industry as entity 140 may be used to calculate the confidence intervals for certain values in the prediction model 150, including the data asset predictions 160. Other techniques also may be utilized to calculate the confidence intervals.

In some embodiments, the platform hosting the prediction model 150 can store a data asset registry 190 for each entity 140. The data asset registry 190 can comprise software functions and GUIs that provide an entity 140, or individuals associated with the entity 140, to access information and insights relating the entity's data assets 145. Amongst other things, the data asset registry 190 can store: 1) data maturity information; 2) data ownership information (e.g., indicating owners, users, and/or roles associated with each of the data assets 145); 3) information for each data asset indicating the use cases, usage, and relevance to strategic goals; and/or 4) importance indicators for each of the data assets 145 (e.g., indicating the importance, criticality, and/or dependency information related to each of the data assets). The data asset registry 190 can provide a centralized view of the entity's data assets 145, along with various metrics and analytics relating to the data assets 145. This enables entity users to inspect the data assets 145 from multiple perspectives, understand how the data assets 145 are managed and used (and by whom), and understand the contributions of the data assets 145 to the entity's strategic goals and initiatives.

With respect to the data maturity information mentioned above, the platform associated with the prediction model 150 can include a maturity framework that assesses and evaluates the maturity of an entity's data assets 145 and provides insights on improving the maturity of data assets

145. To evaluate the maturity of a given data asset, the maturity framework can consider survey responses from individuals associated with the entity, store data identifying data roles (or personas), and map the survey responses to the data roles. Maturity scores can be generated and visualized via the platform based on the survey responses and mappings. The maturity framework also can analyze the current maturity state of the data assets and provide recommendations for improvements.

It should be noted that although FIG. 1B shows certain components (e.g., the relevance model 181, the correlation model 182, the dependency model 184, the criticality model 186, and the asset identification model 187) as being included within a machine learning architecture 150, these functionalities performed by these components can be implemented using various techniques, including techniques that do not rely on machine learning. Additionally, although these components may be described as being distinct or separate modules in certain examples, it should be understood that the functionalities of the components can be combined in various ways.

Figure 2:
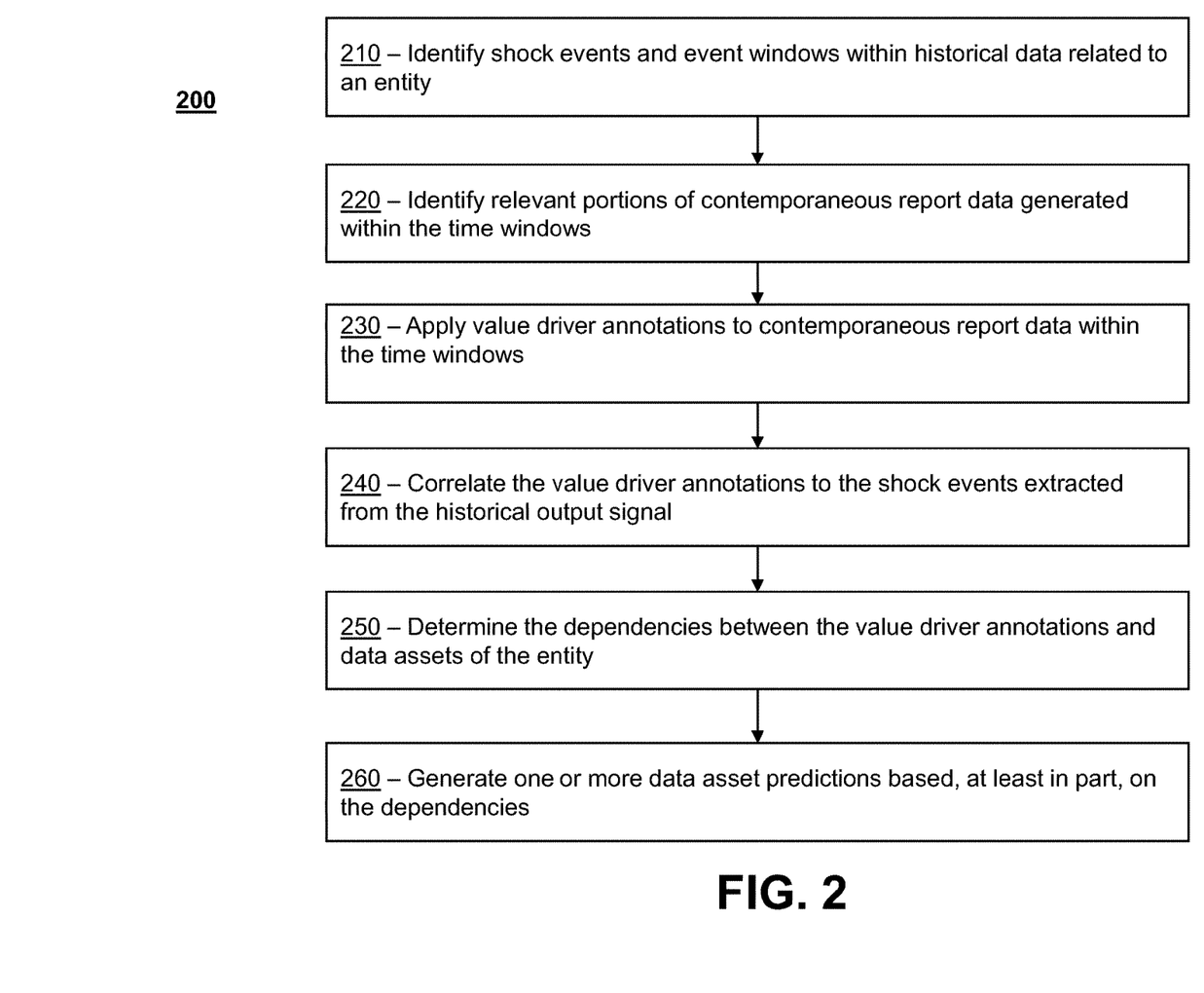
FIG. 2 is a flowchart illustrating an exemplary method for generating data asset predictions relating to the data assets of an entity in accordance with certain embodiments.

FIG. 2 illustrates a flow chart for an exemplary method 200 for generating data asset predictions 160, according to certain embodiments. Method 200 is merely exemplary and is not limited to the embodiments presented herein. Method 200 can be employed in many different embodiments or examples not specifically depicted or described herein. In some embodiments, the steps of method 200 can be performed in the order presented. In other embodiments, the activities of method 200 can be performed in any suitable order. In still other embodiments, one or more of the steps of method 200 can be combined or skipped. In many embodiments, system 100 and/or prediction model 150 can be configured to perform method 200 and/or one or more of the steps of method 200. In these or other embodiments, one or more of the steps of method 200 can be implemented as one or more computer instructions configured to run at one or more processing devices 102 and configured to be stored at one or more non-transitory computer storage devices 101. Such non-transitory memory storage devices 101 can be part of a computer system such as system 100 and/or prediction model 150. The processing device(s) 102 can be similar or identical to the processing device(s) 102 described above with respect to computer system 100 and/or prediction model 150.

In step 210, shock events 171 and event windows 172 are identified in the historical data 131 associated with an entity 140. The shock events 171 and event windows 172 can correspond time periods in the historical data 131 when the actual value of an entity 140 diverged from its expected value beyond a threshold. As discussed above, the event detection module 170 can utilize various techniques to identify the shock events 171 and event windows 172. An appropriate technique can be selected based on the nature of the entity 140 being analyzed, the types and nature of the data assets 145 related to it, and other relevant attributes of the entity 140.

In step 220, relevant portions of contemporaneous report data 132 generated within the time windows are identified. As mentioned above, the relevance model 181 may analyze the contemporaneous report data 132 published or generated within the time windows to identify content, or portions thereof, that are relevant to the entity 140.

In step 230, the contemporaneous report data 132 occurring within the time windows is tagged with one or more value driver annotations 183. As explained above, each value driver annotation 183 generally can identify a factor that contributed to the performance of the entity 140 and/or affected the value of the entity 140. In some embodiments, the value driver annotations 183 can be applied using the correlation model 182 described above.

In step 240, the value driver annotations 183 added in the contemporaneous report data 132 are correlated to the shock events 171 in the historical data 131. In some embodiments, these correlations can be determined using the correlation model 182 described above.

In step 250, the dependencies between the value driver annotations 183 and data assets 145 of the entity 140 are determined or calculated. In some embodiments, the dependency model 184 described above can be utilized to determine these dependencies. For example, in some embodiments, the dependency model 184 can output dependency scores indicating the extent to which data (or the entity's data assets 160) contribute to each value driver (or corresponding value driver annotation 183) and/or the dependency of each value driver on data (or the entity's data assets 160).

In some embodiments, a criticality component 186 also may generate criticality scores across each of the entity's data assets 160. As explained above, the criticality scores may indicate the importance of the entity's data assets 160 with respect to each of the value drivers (or corresponding value driver annotations 183).

In step 260, one or more data asset predictions 260 are generated based, at least in part, on the dependencies between the value driver annotations and data assets 145 of the entity 140. In some instances, the data asset predictions 260 can be generated, at least in prat, using a plurality of inputs such as the data dependency scores, the criticality scores, and/or values assigned to value drivers.

In some embodiments, the one or more data asset predictions 160 may be presented and/or stored on one or more computing devices 110. Additionally, or alternatively, the one or more data asset predictions 160 may be used for further calculations performed on one or more of the computing devices 110 or on the server 120 or another device capable of performing calculations (not shown).

Figure 3:
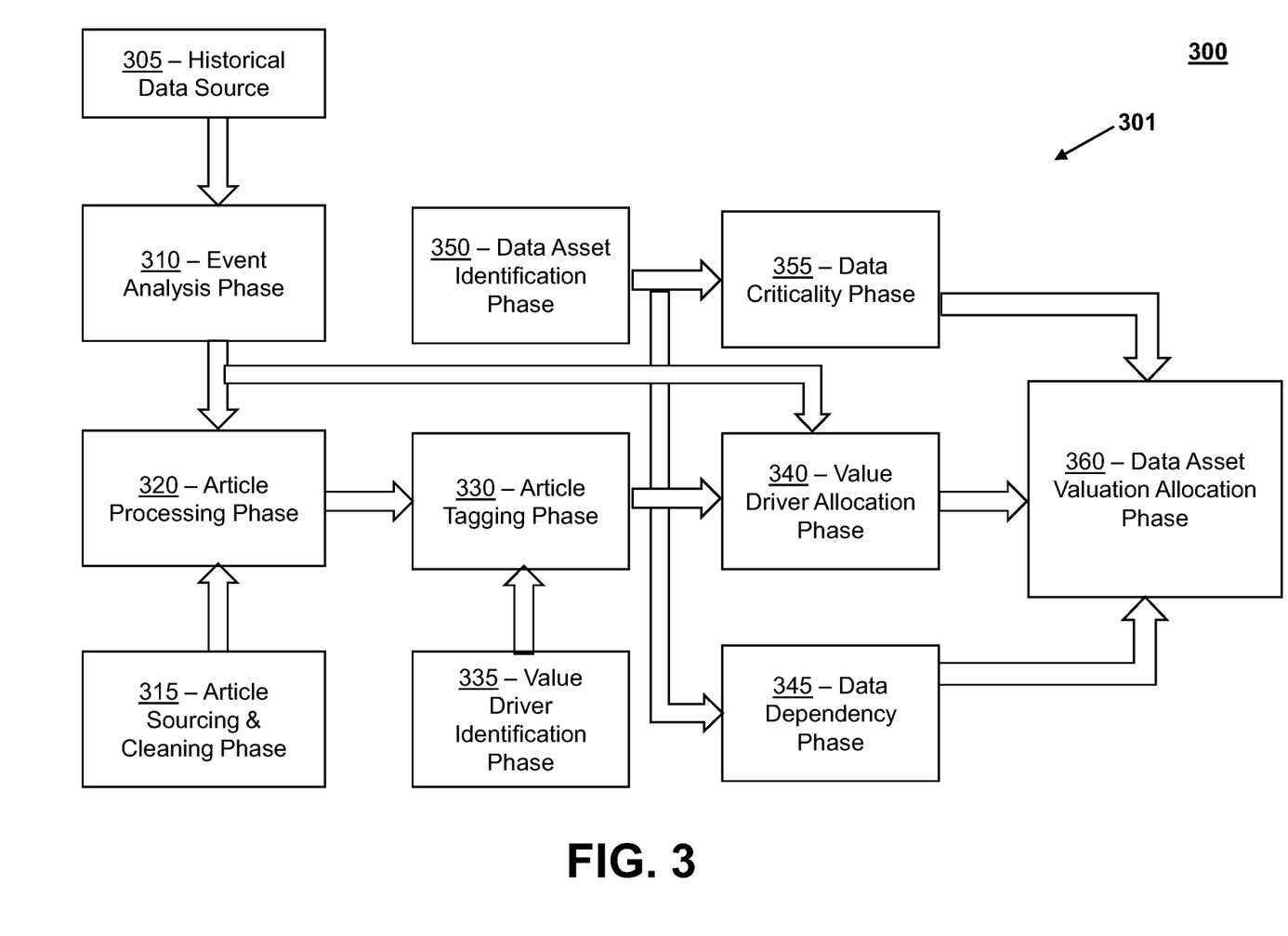
FIG. 3 is a block diagram illustrating an exemplary process flow for analyzing data assets and generating data asset predictions for the data assets.

FIG. 3 is a block diagram illustrating an exemplary data asset evaluation system 301 and corresponding process flow 300 for generating data asset predictions according to certain embodiments. Some or all of the functions described in connection with process flow 300 can be executed by the prediction model 150 and/or systems described herein. In some scenarios, the process flow 300 can be executed in connection with providing a MBV (market-based valuation), a stakeholder valuation, and/or other type of analysis, for an entity 140.

In an event processing phase 310, historical data 131 is obtained from a historical data source 305 (e.g., an external data source 130). The historical data 131 obtained from the historical data source 305 can comprise the stock price information for the entity 140 over a period of time (e.g., a five year time period). The event processing phase 310 analyzes the historical data 131 to identify shock events 171 that have negatively or positively impacted the entity. This can be achieved by detecting abnormalities or outliers in the financial information, such as when there is a deviation in the actual stock price versus the expected stock price above a threshold. This can be useful in determining how the entity 140 overperformed or underperformed compared to expected performance. As explained above, various models can be utilized to predict the expected value or performance of the entity 140. For each detected shock event 171, a corresponding event window 172 can be identified which corresponds to the period of time leading up to the shock wave 171 though the period following the shock event 171 (e.g., when the stock price stabilizes). The output of the event processing phase 310 can be a series of dates (corresponding to the shock events 171 and event windows 172) and the effects on the stock price during those dates. The event detection module 170 can be configured to perform some or all of the functions performed in the event processing phase 310.

The article processing phase 320 receives the outputs of the event processing phase 310. The article processing phase 320 receives articles (and/or other contemporaneous report data 132) relevant to the entity 140 during the event windows 172 identified in the event processing phase 310. In the article sourcing and cleaning phase 315, the articles and other contemporaneous report data 132 are gathered, pre-processed, and cleaned to enable processing in article processing phase 320. The content of the articles can assist with identifying the causes of the shock events 171. In article processing phase 320, the articles are analyzed to detect articles, or portions or articles, that are relevant to the entity 140, and the output of the article processing phase 320 can include the relevant articles or relevant portions or articles. The relevance model 181 can be configured to perform some or all of the functions performed in the article processing phase 320.

The article tagging phase 330 can receive the outputs of the article processing phase 320 and assign or tag the articles (or article portions) with value drivers. Each of the value drivers can correspond to factors that have an impact on the business of the entity 140 (e.g., government regulations, initiatives programs launched by the entity, mergers or acquisitions involving the entity, etc.). As explained above, various types of automated and/or manual techniques can be utilized to identify appropriate value drivers and to assign corresponding value driver annotations 183 to the article content. The output of the article tagging phase 330 can include the article content tagged or annotated with the value drivers. The correlation model 182 can be configured to perform some or all of the functions performed in the article tagging phase 330.

The value driver allocation phase 340 can receive the output of both the article tagging phase 330 (comprising the tagged article content) and the event analysis phase 310 (comprising the dates corresponding to the shock events 171 and event windows 172, as well as the effects on the stock price during those time periods). In general, the value driver allocation phase 340 correlates the impact of the value drivers on the stock prices during the shock events 171 or corresponding event windows 172. This allows the system to quantify how sensitive the entity's value is with respect to the value drivers. The output of the value driver allocation phase 340 can include the values associated with each of the value drivers. The correlation model 182 can be configured to perform some or all of the functions performed in the driver allocation phase 340.

In some embodiments, the correlation model 182 can initially perform analysis on each detected shock event 171 to determine the frequency of each value driver annotation 183 within a corresponding event window 182, which can be used to correlate the impact of the value drivers on the stock prices and/or value of the entity 140. The value of each value driver can then be calculated as a percentage of the predicted value of the entity 140 (e.g., which may be derived from a market capitalization and/or stakeholder data evaluation reflecting the economic value the company creates for its investors). Other techniques also can be used to calculate the values associated with each of the value drivers.

The data dependency phase 345 can output dependency scores indicating the extent to which data contributes to the value of the value drivers. Each dependency score may include a percentage, or other metric, indicating how dependent a given value driver with respect to data. As mentioned above, this can be performed using various techniques. The dependency model 184 can be configured to perform some or all of the functions performed in the data dependency phase 345.

In the data asset identification phase 350, a listing or inventory of data assets 145 related to the entity 140 is generated. As mentioned above, the data assets 145 associated with the entity 140 can vary based on the industry or sector associated with the entity 140, and manner in which the data assets 145 are identified also can vary. In some embodiments, users may be presented with GUIs that display libraries or catalogs of candidate data assets applicable to an entity 140 under review, and a human reviewer can identify or select applicable data assets 145. Additionally, or alternatively, a learning model can be trained to generate a listing of candidate data assets for human review. The asset identification model 187 can be configured to perform some or all of the functions performed in the data asset identification phase 350.

The data criticality phase 355 receives a listing identifying all of the entity's data assets 145 (which is identified or compiled by in the data asset identification phase 350) and a listing identifying value drivers. The data criticality phase 355 can determine and assign criticality scores or values to each data asset 145 indicating how critical each data asset 145 is to each value driver and/or which quantifies the importance of each data asset to the value of each data driver. As explained above, the criticality scores may be calculated based, at least in part, on survey responses provided by individuals associated with the entity 145. The criticality of each data asset 145 for each value driver can be transformed into a percentage, thereby permitting the data value to be proportionally divided. The criticality model 186 can be configured to perform some or all of the functions performed in the data criticality phase 355.

In the data asset valuation allocation phase 360, the value of the data assets 145 for the entity 140 are determined or predicted. The data asset valuation allocation phase 360 can generate these predictions using the outputs of value driver allocation phase 340, the outputs of the data dependency phase 345, and/or the outputs of the data criticality phase 355. In some examples, the values associated with each of the value drivers (as determined in the value driver allocation phase 340) can be multiplied by percentages included in the dependency scores (as determined in the value driver allocation phase 345), and the product can be combined with the criticality scores (as determined in the data criticality phase 355) to compute the value(s) for the data assets 145, either individually or as a total. In some embodiments, some or all of the functions in the data asset valuation allocation phase 360 can be performed by an asset evaluation model (or other component) included in the prediction model 150.

The data asset evaluation system 301 can be utilized generate many other types of data asset predictions 160 in addition to the predictions that relate to the value(s) for the data assets 145. For example, the various metrics (e.g., dependency scores, criticality scores, value driver values, etc.) generated throughout the process flow 300 can be utilized to generate data asset predictions 160 indicating the importance of data assets, the sensitivity of the entity 140 to value drivers, the health or condition of assets, etc.

As evidenced by the disclosure herein, the inventive techniques set forth in this disclosure are rooted in computer technologies that overcome existing problems known related to objectively assessing and quantifying the data assets of entities. The techniques described in this disclosure provide a technical solution (e.g., one that utilizes prediction models and machine-learning techniques) for overcoming the limitations associated with known techniques. This technology-based solution marks an improvement over existing capabilities and functionalities for assessing and quantifying the data assets of entities.

Further, in many embodiments, the techniques described herein can be used continuously at a scale that cannot be reasonably performed using manual techniques or the human mind. Such processing cannot be performed by manual techniques or with the human mind. Moreover, the complexity of certain embodiments that rely on machine learning architectures prevents its manual implementation.

In certain embodiments, a computerized method is provided for quantifying or analyzing data assets. The method can include: providing an asset evaluation system that is configured to generate one or more data asset predictions for data assets associated with an entity; receiving, by an event analysis module of the asset evaluation system, historical data relating to the entity; detecting, by the event analysis module, at least one shock event corresponding to the entity based on an analysis of the historical data; identifying an event window corresponding to the at least one shock event; accessing contemporaneous report data generated or published during the event window; analyzing, using a relevance model of the asset evaluation system, the contemporaneous report data to identify portions of the contemporaneous report data that are relevant to the entity; assigning one or more value driver annotations to the portions of the contemporaneous report data identified as being relevant to the entity, each of the one or more value driver annotations corresponding to a label that identifies a value driving factor that contributed to the at least one shock event; determining a value for each of the one or more value driver annotations; and generating the one or more data asset predictions based, at least in part, on the value for each of the one or more value driver annotations.

In certain embodiments, a system is provided for quantifying or analyzing data assets. The system includes one or more computing devices comprising one or more processing devices and one or more non-transitory storage devices that store instructions. Execution of the instructions by the one or more processing devices can cause the one or more computing devices to: provide an asset evaluation system that is configured to generate one or more data asset predictions for data assets associated with an entity; receive, by an event analysis module of the asset evaluation system, historical data relating to the entity; detect, by the event analysis module, at least one shock event corresponding to the entity based on an analysis of the historical data; identify an event window corresponding to the at least one shock event; access contemporaneous report data generated or published during the event window; analyze, using a relevance model of the asset evaluation system, the contemporaneous report data to identify portions of the contemporaneous report data that are relevant to the entity; assign one or more value driver annotations to the portions of the contemporaneous report data identified as being relevant to the entity, each of the one or more value driver annotations corresponding to a label that identifies a value driving factor that contributed to the at least one shock event; determine a value for each of the one or more value driver annotations; and generate the one or more data asset predictions based, at least in part, on the value for each of the one or more value driver annotations.

In certain embodiments, a computer program product is provided for quantifying or analyzing data assets. The computer program product comprises one or more non-transitory computer-readable media including instructions for causing a computing device to: provide an asset evaluation system that is configured to generate one or more data asset predictions for data assets associated with an entity; receive, by an event analysis module of the asset evaluation system, historical data relating to the entity; detect, by the event analysis module, at least one shock event corresponding to the entity based on an analysis of the historical data; identify an event window corresponding to the at least one shock event; access contemporaneous report data generated or published during the event window; analyze, using a relevance model of the asset evaluation system, the contemporaneous report data to identify portions of the contemporaneous report data that are relevant to the entity; assign one or more value driver annotations to the portions of the contemporaneous report data identified as being relevant to the entity, each of the one or more value driver annotations corresponding to a label that identifies a value driving factor that contributed to the at least one shock event; determine a value for each of the one or more value driver annotations; and generate the one or more data asset predictions based, at least in part, on the value for each of the one or more value driver annotations.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A computerized method for quantifying or analyzing data assets that is executed by one or more processing devices and stored as computing instructions on one or more non-transitory storage devices, the method comprising:
   providing, via execution of the computing instructions by the one or more processing devices, an asset evaluation system that is configured to generate one or more data asset predictions for data assets associated with an entity;
   receiving, by an event analysis module of the asset evaluation system stored on the one or more non-transitory storage devices, historical data relating to the entity;
   detecting, by execution of the event analysis module on the one or more processing devices, at least one shock event corresponding to the entity based on an analysis of the historical data;
   identifying, by the one or more processing devices, an event window corresponding to the at least one shock event;
   accessing, by the one or more processing devices, contemporaneous report data generated or published during the event window;
   electronically analyzing, using a relevance model of the asset evaluation system that is executed by the one or more processing devices, the contemporaneous report data to identify portions of the contemporaneous report data that are relevant to the entity, wherein:
   the relevance model comprises a learning model that is pre-trained to determine whether textual content generated or published during the event window is relevant to the entity;
   the relevance model analyzes the textual content generated or published during the event window to identify the portions of the textual content that are relevant to the entity and other portions of the textual content that are not relevant to the entity; and
   the relevance model assigns relevance labels to the portions of textual content that are determined to be relevant to the entity and assigns irrelevant labels to the other portions of the textual content;
   assigning, by the one or more processing devices, one or more value driver annotations to the portions of the contemporaneous report data identified as being relevant to the entity, each of the one or more value driver annotations corresponding to a label that identifies a value driving factor that contributed to the at least one shock event;
   determining, by the one or more processing devices, a value for each of the one or more value driver annotations; and
   electronically generating, by the one or more processing devices, the one or more data asset predictions based, at least in part, on the value for each of the one or more value driver annotations.

2. The method of claim 1, wherein:
the asset evaluation system comprises a machine learning architecture comprising one or more pre-trained learning models that contribute to generating the one or more data asset predictions.

3. The method of claim 1, wherein:
the asset evaluation system includes a data dependency model that is configured to determine dependencies between the data assets associated with the entity and the one or more value driver annotations; and
the one or more data asset predictions are generated based, at least in part, on the dependencies between the data assets and the one or more value driver annotations.

4. The method of claim 1, wherein the one or more data asset predictions include at least one of:
a prediction that quantifies or measures a value for at least one of the data assets associated with the entity;
a prediction that quantifies or measures a cumulative value across all of the data assets associated with the entity;
a prediction that quantifies or measures an importance of at least one data asset associated with the entity;
a prediction that quantifies or measures a cumulative importance across all of the data asset associated with the entity or
a prediction that quantifies or measures a data health condition for the data assets or a portion of the data assets associated with the entity.

5. The method of claim 1, wherein:
the at least one shock event represents a point in time when an actual value of the entity was lesser or greater than an expected value of the entity;
the actual value of the entity is determined based, at least in part, on the historical data associated with the entity; and
the expected value of the entity is determined based, at least in part, on a valuation model that compares a historical performance of the entity and a market index relevant to the entity.

6. The method of claim 5, wherein:
the event window corresponds to a time period in which an abnormality corresponding to at least one shock event is detected with respect to the expected value of the entity; and
the event window defines a beginning time and an ending time for the at least one shock event.

7. The method of claim 1, wherein:
each of the one or more value driver annotations corresponds to a separate value driving factor that negatively or positively influences a value of the entity or the data assets associated with the entity.

8. The method of claim 7, wherein:
the asset evaluation system further includes a criticality model that is configured to generate or predict one or more criticality scores indicating an importance of the data assets with respect to each value driving factor; and
the one or more data asset predictions are generated, at least in part, using the one or more criticality scores.

9. The method of claim 1, wherein:
the contemporaneous report data includes articles, publications, reports, or public information that became available during the event window corresponding to the at least one shock event;
the contemporaneous report data is preprocessed to extract textual data; and
the relevance model analyzes the textual data to identify information relevant to the entity during the event window.

10. The method of claim 1, wherein:
the asset evaluation system comprises a machine learning architecture comprising one or more pre-trained learning models that contribute to generating the one or more data asset predictions;
the one or more pre-trained learning models include a data dependency model; and
the data dependency model is pre-trained to output one or more scores indicating or estimating the dependencies between the data assets and the one or more value driver annotations.

11. A system for quantifying or analyzing data assets, wherein the system includes one or more computing devices comprising one or more processing devices and one or more non-transitory storage devices that store instructions, wherein execution of the instructions by the one or more processing devices causes the one or more computing devices to:
provide, via execution of the computing instructions by the one or more processing devices, an asset evaluation system that is configured to generate one or more data asset predictions for data assets associated with an entity;
receive, by an event analysis module of the asset evaluation system stored on the one or more non-transitory storage devices, historical data relating to the entity;
detect, by execution of the event analysis module on the one or more processing devices, at least one shock event corresponding to the entity based on an analysis of the historical data;
identify, by the one or more processing devices, an event window corresponding to the at least one shock event;
access, by the one or more processing devices, contemporaneous report data generated or published during the event window;
electronically analyze, using a relevance model of the asset evaluation system that is executed by the one or more processing devices, the contemporaneous report data to identify portions of the contemporaneous report data that are relevant to the entity, wherein:
the relevance model comprises a learning model that is pre-trained to determine whether textual content generated or published during the event window is relevant to the entity;
the relevance model analyzes the textual content generated or published during the event window to identify the portions of the textual content that are relevant to the entity and other portions of the textual content that are not relevant to the entity; and
the relevance model assigns relevance labels to the portions of textual content that are determined to be relevant to the entity and assigns irrelevant labels to the other portions of the textual content;
assign, by the one or more processing devices, one or more value driver annotations to the portions of the contemporaneous report data identified as being relevant to the entity, each of the one or more value driver annotations corresponding to a label that identifies a value driving factor that contributed to the at least one shock event;
determine, by the one or more processing devices, a value for each of the one or more value driver annotations; and
electronically generate, by the one or more processing devices, the one or more data asset predictions based, at least in part, on the value for each of the one or more value driver annotations.

12. The system of claim 11, wherein:
the asset evaluation system comprises a machine learning architecture comprising one or more pre-trained learning models that contribute to generating the one or more data asset predictions.

13. The system of claim 12, wherein:
the asset evaluation system includes a data dependency model that is configured to determine dependencies between the data assets associated with the entity and the one or more value driver annotations; and
the one or more data asset predictions are generated based, at least in part, on the dependencies between the data assets and the one or more value driver annotations.

14. The system of claim 11, wherein the one or more data asset predictions include at least one of:
a prediction that quantifies or measures a value for at least one of the data assets associated with the entity;
a prediction that quantifies or measures a cumulative value across all of the data assets associated with the entity;
a prediction that quantifies or measures an importance of at least one data asset associated with the entity;
a prediction that quantifies or measures a cumulative importance across all of the data asset associated with the entity or
a prediction that quantifies or measures a data health condition for the data assets or a portion of the data assets associated with the entity.

15. The system of claim 11, wherein:
the at least one shock event represents a point in time when an actual value of the entity was lesser or greater than an expected value of the entity;
the actual value of the entity is determined based, at least in part, on the historical data associated with the entity; and the expected value of the entity is determined based, at least in part, on a valuation model that compares a historical performance of the entity and a market index relevant to the entity.

16. The system of claim 15, wherein:
the event window corresponds to a time period in which an abnormality corresponding to at least one shock event is detected with respect to the expected value of the entity; and
the event window defines a beginning time and an ending time for the at least one shock event.

17. The system of claim 11, wherein:
each of the one or more value driver annotations corresponds to a separate value driving factor that negatively or positively influences a value of the entity or the data assets associated with the entity.

18. The system of claim 17, wherein:
the asset evaluation system further includes a criticality model that is configured to generate or predict one or more criticality scores indicating an importance of the data assets with respect to each value driving factor; and
the one or more data asset predictions are generated, at least in part, using the one or more criticality scores.

19. The system of claim 11, wherein:
the contemporaneous report data includes articles, publications, reports, or public information that became available during the event window corresponding to the at least one shock event;
the contemporaneous report data is preprocessed to extract textual data; and
the relevance model analyzes the textual data to identify information relevant to the entity during the event window.

20. A computer program product, the computer program product comprising one or more non-transitory computer-readable media including instructions for causing a computing device to:
provide, via execution of the instructions by the computing device, an asset evaluation system that is configured to generate one or more data asset predictions for data assets associated with an entity;
receive, by an event analysis module of the asset evaluation system executed by the computing device, historical data relating to the entity;
detect, by the event analysis module executed by the computing device, at least one shock event corresponding to the entity based on an analysis of the historical data;
identify, by the computing device, an event window corresponding to the at least one shock event;
access, by the computing device, contemporaneous report data generated or published during the event window;
electronically analyze, using a relevance model of the asset evaluation system that is executed by the computing device, the contemporaneous report data to identify portions of the contemporaneous report data that are relevant to the entity, wherein:
the relevance model comprises a learning model that is pre-trained to determine whether textual content generated or published during the event window is relevant to the entity;
the relevance model analyzes the textual content generated or published during the event window to identify the portions of the textual content that are relevant to the entity and other portions of the textual content that are not relevant to the entity; and
the relevance model assigns relevance labels to the portions of textual content that are determined to be relevant to the entity and assigns irrelevant labels to the other portions of the textual content;
assign, by the computing device, one or more value driver annotations to the portions of the contemporaneous report data identified as being relevant to the entity, each of the one or more value driver annotations corresponding to a label that identifies a value driving factor that contributed to the at least one shock event;
determine, by the computing device, a value for each of the one or more value driver annotations; and
electronically generate, by the computing device, the one or more data asset predictions based, at least in part, on the value for each of the one or more value driver annotations.

* * * * *